(12) United States Patent
Chen et al.

(10) Patent No.: US 6,963,755 B2
(45) Date of Patent: Nov. 8, 2005

(54) METHOD AND APPARATUS FOR COHERENTLY COMBINING POWER CONTROL COMMANDS TO INITIALIZE COMMUNICATION

(75) Inventors: Tao Chen, San Diego, CA (US); Edward G. Tiedemann, Jr., Concord, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 118 days.

(21) Appl. No.: 10/126,753

(22) Filed: Apr. 19, 2002

(65) Prior Publication Data

US 2003/0130002 A1 Jul. 10, 2003

Related U.S. Application Data

(60) Provisional application No. 60/347,592, filed on Jan. 9, 2002.

(51) Int. Cl.[7] .............................................. H04B 7/00
(52) U.S. Cl. ..................... 455/522; 455/445; 455/550.1
(58) Field of Search .............................. 455/550.1, 522, 455/436, 435.1, 445, 437, 438, 439, 550

(56) References Cited

U.S. PATENT DOCUMENTS

| | | | | |
|---|---|---|---|---|
| 5,450,453 A | * | 9/1995 | Frank | 375/130 |
| 6,633,553 B1 | * | 10/2003 | Hwang | 370/329 |
| 2002/0101832 A1 | * | 8/2002 | Chen et al. | 370/318 |

FOREIGN PATENT DOCUMENTS

| | | |
|---|---|---|
| WO | 9938278 | 7/1999 |
| WO | 0007377 | 2/2000 |
| WO | 0074289 A1 | 12/2000 |

* cited by examiner

Primary Examiner—Edward F. Urban
Assistant Examiner—Thuan Nguyen
(74) Attorney, Agent, or Firm—Philip R. Wadsworth; Thien T. Nguyen; Pavel Kalousek

(57) ABSTRACT

A power control system for use in facilitating transition to an active state suitable for use in a wireless communication system. In one aspect, the system includes a first transceiver, such as a BTS, having the ability to initiate transmission of a power control function. The transceiver comprises a generator for generating a power control arrangement and a transmitter for transmitting the power control arrangement. The system further includes a second transceiver, such as a terminal, for receiving the power control arrangement and coherently combining the power control arrangement to determine a state transition indication. The second transceiver includes a transmitter that transmits a selected waveform subsequent to the coherent combining. The first transceiver receives the selected waveform, determines a power level associated therewith, and provides feedback to the second transceiver. The power control arrangement may include groups of redundant power control data, data transmitted on idle feedback dimensions, or predetermined signal patterns in addition to at least one power control group.

16 Claims, 10 Drawing Sheets

METHOD AND APPARATUS FOR COHERENTLY COMBINING POWER CONTROL COMMANDS TO INITIALIZE COMMUNICATION

CROSS REFERENCE

This application claims priority from provisional application No. 60/347,592, filed Jan. 9, 2002 and currently assigned to the assignee of the present invention.

BACKGROUND

1. Field

The present invention relates generally to the field of wireless communication systems, and more specifically to efficiently initializing power control commands for effective two-way communication.

2. Background

In a wireless communications system, a user having a terminal (e.g., a cellular phone) communicates with another user via transmissions on the downlink (forward link) and the uplink (reverse link) through one or more base stations. Downlink or forward link refers to transmission from the base station to the terminal, while uplink or reverse link refers to transmission from the terminal to the base station.

Cellular telecommunications systems, such as Code Division Multiple access (CDMA) communications systems, are often characterized by a plurality of mobile stations, or terminals (e.g. cellular telephones, mobile units, wireless telephones, or mobile phones) in communication with one or more Base Station Transceiver Subsystems (BTSs). Signals transmitted by the mobile stations are received by a BTS and often relayed to a Mobile Switching Center (MSC) having a Base Station Controller (BSC). Alternately, mobile station transmissions may be received by a BTS and relayed to a Public Data Serving Node (PDSN) through a BSC. The MSC and the PDSN, in turn, route the signal to a Public Switched Telephone Network (PSTN), a data network, or to another wireless phone. Similarly, a signal may be transmitted from the PSTN or data network to a wireless phone via a base station or BTS and an MSC, or via a BTS, a BSC, and a PDSN.

CDMA systems utilizing the foregoing communication transfer arrangements are typically designed to conform to one or more standards. Such standards include the "TIA/EIA/IS-95-B Mobile Station-Base Station Compatibility Standard for Dual-Mode Wideband Spread Spectrum Cellular System" (the IS-95 standard), the "TIA/EIA/IS-98 Recommended Minimum Standard for Dual-Mode Wideband Spread Spectrum Cellular Mobile Station" (the IS-98 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and the "TR-45.5 Physical Layer Standard for cdma2000 Spread Spectrum Systems" (the cdma2000 standard). New CDMA standards are continually proposed and adopted for use. These CDMA standards are incorporated herein by reference.

In a typical communications system, such as a CDMA or cdma2000 system, proper operation requires that the terminal transmit data, such as voice traffic, at the lowest possible power level to minimize interference between terminals. Conversely, if the terminal power level is too low, the BTS will be unable to properly receive and decode packets or frames received from the terminals. This tradeoff requires monitoring and maintenance of the transmission power of each individual terminal, as well as the received signal to noise and interference ratio from each terminal. Optimal performance occurs when each terminal transmits at the minimum power that allows for proper decoding of the reverse frames at the BTS.

In operation, the terminal has the ability to enter certain states. These states may include an Idle state, where the terminal is able to transmit or receive signals from the base station but is not actively transmitting or receiving, and an Active state, where the terminal is actively transmitting to the BTS, receiving data from the BTS, or both. The power and capacity consumed in these states, particularly the Active state, is not insignificant under normal operating conditions. Further, use of the previously known Active state tends to limit the number of users that may occupy a particular channel in communication with a BTS. Further, the time required to transition a terminal from the Idle state to the Active state is also nontrivial, and this delay affects the quality of the link between the terminal and the BTS. As a result, certain newer standards, such as cdma2000, provide the terminal with the ability to enter different states with the goal of enabling additional users to access channels, while at the same time efficiently controlling power usage, delay, overhead, battery life, and processing time, among other parameters. cdma2000, for example, includes Active, Control Hold, Dormant, and Null states. Certain of these states include intermediate or transition submodes or substates previously unavailable to the terminal, and allow for enhanced power consumption control as well as permitting additional users access to available bandwidth.

The Control Hold mode is a newer mode that represents a state where the dedicated Medium Access Control (MAC) control channel is maintained, but the dedicated traffic control channel is not maintained. The Control Hold mode supports a large number of users by reducing forward link and reverse link loading and facilitates fast transition to the Active mode. The Control Hold mode is an active state with respect to control signals, but idle with respect to traffic, thus saving power required for traffic while allowing control signal transmission.

In cdma2000, a BTS's desire to have the terminal transition from either the Idle substate of the Dormant mode, herein called the Idle state, or the Control Hold mode to the Active mode may be indicated by a BTS transmission of power control signals to the terminal during a fixed period of time recognized by the terminal. Previous attempts to provide power control signals during this transmission period have generally been limited to the BTS transmitting a fixed value to the terminal, and the terminal transmitting at a predetermined power level independent of the signal to noise ratio or the distance from the terminal to the BTS. This arrangement results in an inaccurate power level transmission at the beginning of the Active mode, typically resulting in lower link quality, interference to other terminals on the reverse link, or both. An excessively high power level transmitted by the terminal upon entering the Active mode then requires dynamic correction in the Active mode, which requires system processing, provides poor traffic quality, and is generally undesirable. On the other hand, an excessively low power level transmitted by the terminal upon entering the Active mode causes low link quality and also requires dynamic correction in the Active mode, both of which are generally undesirable. The previous power control transition scheme thus produced improper results, interference, and created certain delays before a condition appropriate power level was made available between the terminal and the BTS.

A further power control problem can occur when the terminal and BTS interact in the presence of interference or inefficient signal transmission conditions. For example, the terminal may transmit during periods when the BTS is assessing signal strength, and the BTS may not receive the terminal transmission for various reasons. Failure to receive a signal from the terminal can cause the BTS to transmit commands to the terminal to increase power. Such transmission inefficiency can further increase the possibility of incorrect power control commands transmitted from the BTS to the terminal and result in further delay before an adequate signal is available.

Furthermore, other CDMA systems, such as those currently available, transition between different states and have similar limitations in establishing effective power control feedback and sufficient Active mode quality. For example, a BTS in a previously known CDMA communication system can request that a terminal transition from the Idle state to the Active state, a process sometimes referred to as traffic channel initialization. Once the BTS notifies the terminal of the forward link channel, the terminal attempts to acquire the signal from the BTS. The signal acquired from the BTS by the terminal may comprise the power control signal, or a combination of the power control signal and other forms of signals. In this arrangement, as in cdma2000, slow acquisition of the BTS signal by the terminal, as well as a delayed start of effective power control operation, increases delay in setting up two-way communication, decreases link quality, and increases interference to other terminals using the reverse link. These systems suffered from the serial nature of the power control feedback scheme, as the terminal awaited the indication from the BTS, which it had to successfully detect, the terminal then had to initiate transmission on the reverse link, which the BTS may not receive, and the BTS would transmit power control commands having no basis on actual power transmission, which would require time to correct. Thus the time required to set up the BTS-terminal interaction, plus the time required to correct the improper power control commands could be relatively significant.

There is therefore a need in the art for an efficient power control technique during transition between modes in CDMA systems generally, such as from the Idle substate of the Dormant Mode or the Control Hold mode into the Active mode in cdma2000, as well as from the Idle state to the Active state in previous CDMA versions, that avoids the previously known drawbacks of delay, improper power transmission by the terminal upon entering the Active mode, and associated interference and channel capacity limitations.

SUMMARY

Aspects disclosed herein address the above stated needs by providing a power control design for use in a wireless communication system. The design includes transmitting data between a terminal and transmitter, such as a BTS, in an efficient manner to promote rapid transition from an inactive state, such as the cdma2000 control hold state or the idle state of cdma2000 and previous CDMA systems, to an active state and establishing rapid transmission of power control commands to the terminal and effective use thereof. The design disclosed herein may be employed between two transceivers seeking a state transition from a non-active state to an active state wherein power control commands are exchanged therebetween. In one aspect of the present invention, transmitted signal strength is controlled by detecting at a second transceiver a presence of power control feedback received from a first transceiver. The first transceiver may include a BTS and the second transceiver may include a terminal, and vice versa. The design coherently combines the detected power control feedbacks across a window of commands, and includes activating a transmitter at the second transceiver and transmitting either predetermined waveforms or regular traffic information, or pre-determined waveforms followed by said regular traffic information from the first transceiver to the second transceiver.

According to another aspect of the present design, states are transitioned in a wireless communication system by receiving power control information at a first transceiver, coherently combining the power control information at the first transceiver, and transmitting, subsequent to the coherent combining, a transmission set including at least one from a group including predetermined waveforms and regular traffic.

According to a third aspect of the design, the wireless communication system comprises a first transceiver having the ability to initiate transmission of a power control function, where the first transceiver comprises a generator for generating a power control arrangement and a transmitter for transmitting the power control arrangement. The system further includes a second transceiver for receiving the power control arrangement and coherently combining the power control arrangement to determine a transition indication. The second transceiver transmits a selected waveform subsequent to the coherent combining, and the first transceiver receives the selected waveform, determines a power level associated therewith, and provides feedback to the second transceiver.

In a fourth aspect of the current design, the presence of a power control command in a wireless communication system is determined by receiving data including power control information in a predetermined pattern and coherently combining the received data and determining the presence of a power control command based on the coherently combined data.

The invention further provides methods and other elements that implement various aspects and features of the invention, as described in further detail below

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
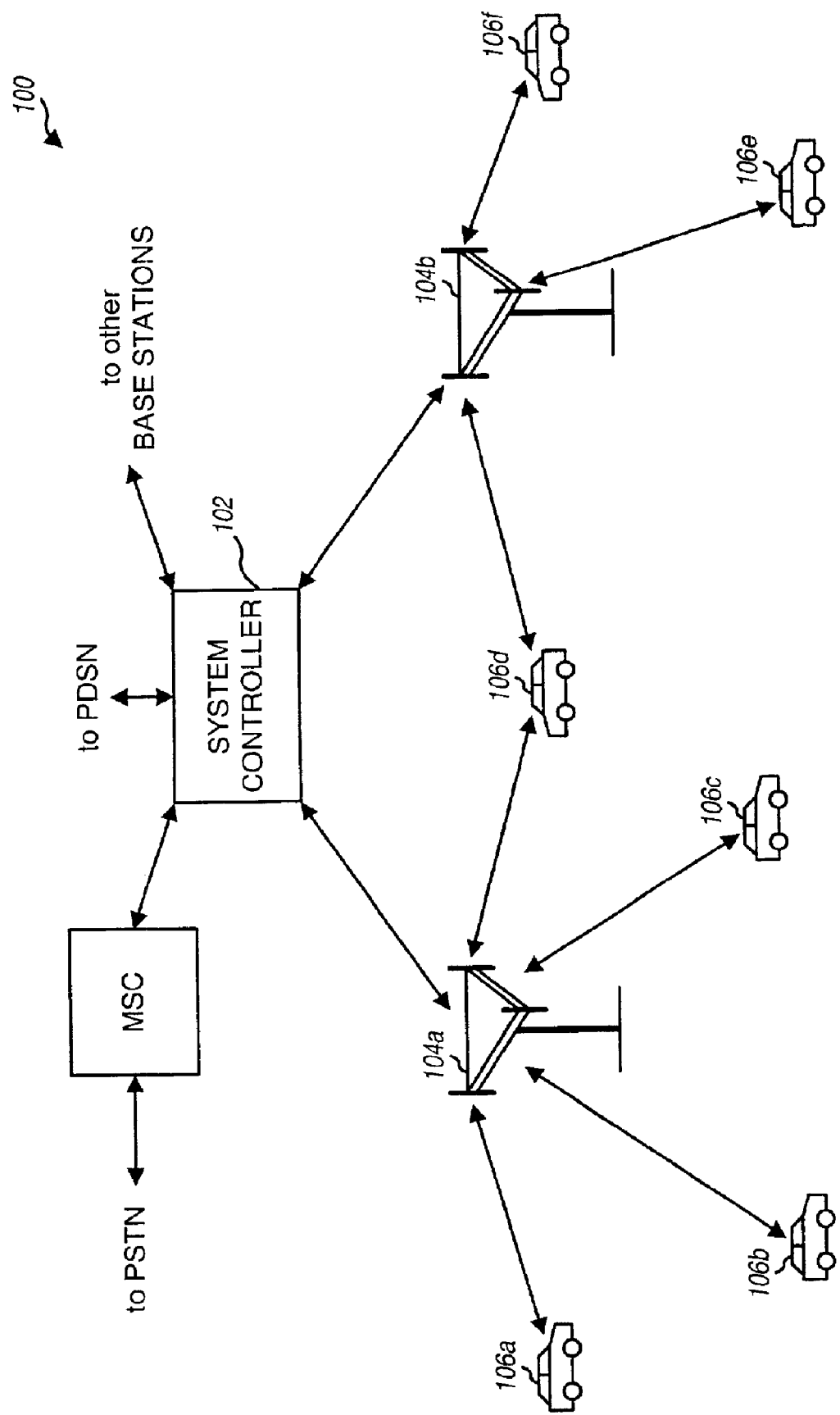
FIG. 1 is a diagram of a spread spectrum communication system that supports a number of users communicating via remote terminals that interact with a set of base stations.

Definitions.

A subscriber station, referred to herein as a terminal, or mobile, may be any mobile or stationary remote station in a system where power control exists, such as a CDMA wireless communication system. A subscriber station, terminal, or mobile may communicate with one or more base stations, referred to herein as base station transceivers (BTS). A terminal transmits and receives data packets through one or more base station transceivers to a base station controller (BSC). Base station transceivers and base station controllers are parts of a network. The network may be connected to additional hardware or systems outside the network, such as a PSTN, a corporate intranet or the Internet, and may transport voice signal or data packets between each access terminal and such outside hardware or systems. A terminal having established an active traffic channel connection with one or more base station transceivers is called an active terminal, and is said to be in a traffic state. A terminal may be any data device that communicates through a wireless channel or through a wired channel, for example using fiber optic or coaxial cables. A terminal may further be any of a number of types of devices including but not limited to PC card, compact flash, external or internal modem, or wireless or wireline phone.

As applied to cdma2000, as used herein, the term Active mode or Active state refers to the state of the terminal wherein the dedicated traffic channel and dedicated control channel are both maintained. The term Control Hold mode or Control Hold state refers to a state in which the MAC control channel is maintained, but the dedicated traffic control channel is not maintained. The term Idle mode or Idle state refers to a specific substate of the Dormant state, where the Dormant state is the state of the terminal where no dedicated logical channels are maintained. In the Idle substate of the Dormant state, users may receive short data bursts and request short data burst transmissions. This application generally discusses cdma2000 transitions from the Idle state to the Active state and from the Control Hold state to the Active state.

As applied to any CDMA protocol other than cdma2000, the term Active mode or Active state indicates a state where the terminal is actively transmitting to the BTS, receiving data from the BTS, or both. The term Idle mode or Idle state indicates a state where the terminal is able to transmit or receive signals from the base station but is not actively transmitting or receiving. In the Idle mode or Idle state, the terminal may receive data over a paging channel and process information received on that channel.

Certain channels mentioned herein, including but not limited to the forward power control channel, forward common signaling channel, common forward link power control channel, dedicated packet data control channel, and dedicated or shared packet data channel are in accordance with the cdma2000 Release C standard, which is incorporated herein by reference. Additional or different channels having similar functionality for the purposes discussed herein may be employed.

System Operation. FIG. 1 is a diagram of a spread spectrum communication system 100 that supports a number of users. System 100 provides communication for a number of cells, with each cell being serviced by a corresponding base station 104. Various remote terminals 106 are dispersed throughout the system. Each remote terminal 106 can communicate with one or more base stations 104 on the forward and reverse links at any particular moment, depending on whether the remote terminal is transmitting and/or receiving data and whether it is in soft handoff. As shown in FIG. 1, base station 104a communicates with remote terminals 106a, 106b, 106c, and 106d and base station 104b communicates with remote terminals 106d, 106e, and 106f.

In system 100, a system controller 102 couples to base stations 104 and may further couple to an MSC, and then to a PSTN, and/or to a PDSN. System controller 102 provides coordination and control for the various base stations coupled to it. System controller 102 further controls the routing of data or telephone calls among remote terminals 106, and between remote terminals 106 and the PSTN (e.g., conventional telephones), via base stations 104. For a CDMA system, system controller 102 is also referred to as a base station controller (BSC).

System 100 may be designed to support one or more CDMA standards such as the IS-95 standard, the W-CDMA standard, the cdma2000 standard, or some other standard. Alternatively or additionally, system 100 may be designed to conform to a particular CDMA implementation.

For some CDMA systems, the communication between a particular remote terminal and one or more base stations is typically non-continuous. The remote terminal typically only transmits data to and/or receives data from the base station(s) for certain particular time periods. At remaining time periods, the remote terminal is "inactive" and may only be receiving the pilot signal(s) from the BTS(s).

As noted above, on the reverse link of a CDMA system, the transmission from each remote terminal acts as interference to other active remote terminals and thus affects the performance of these remote terminals. To improve the performance of the remote terminals and to increase system capacity, the transmit power of each remote terminal is controlled to be as low as possible to reduce the amount of interference while still maintaining a particular level of performance for the transmitting remote terminal.

Figure 2:
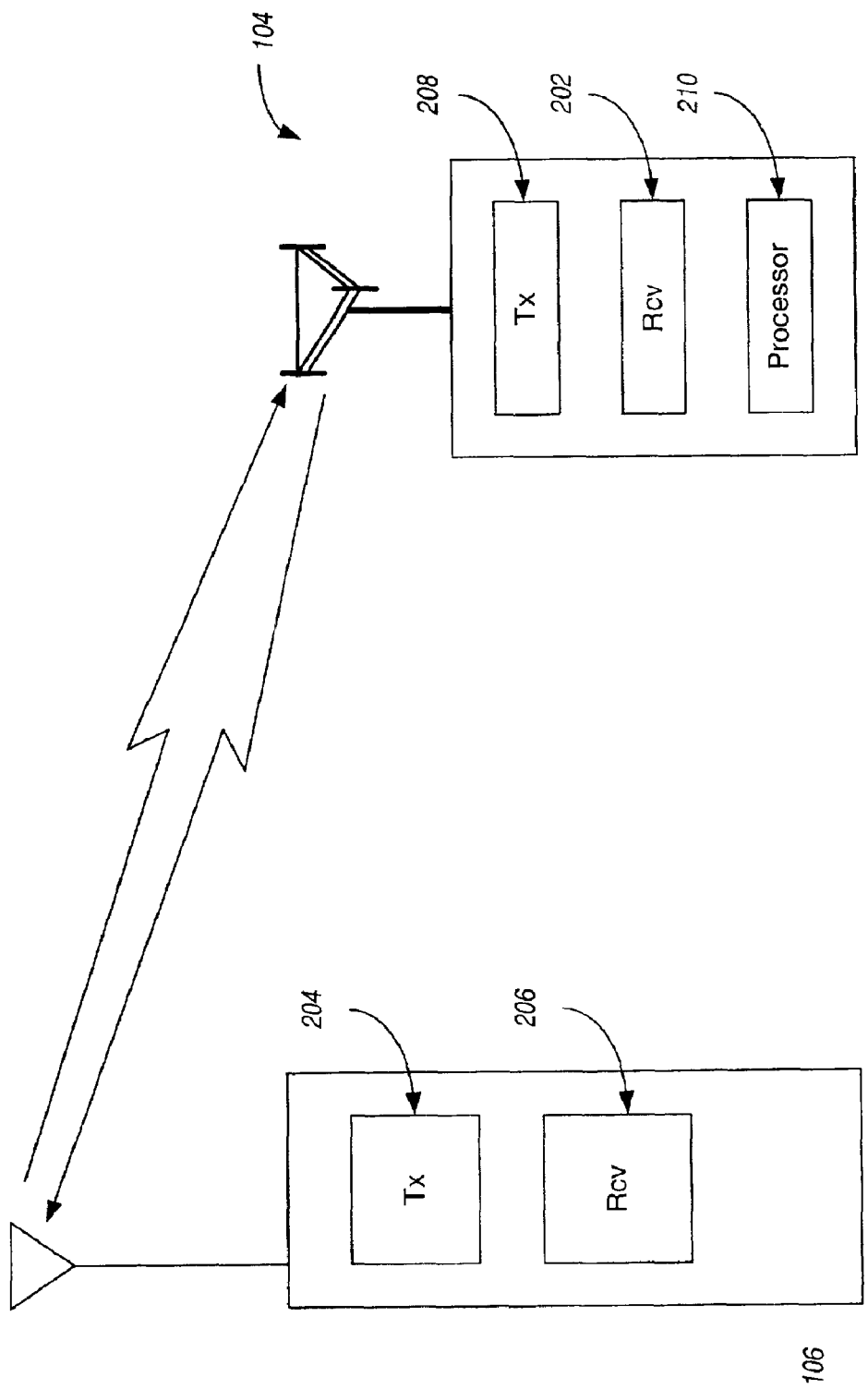
FIG. 2 is a simplified diagram of the terminal-BTS interaction.

A simplified representation of the terminal-BTS interaction is provided in FIG. 2. In the wireless communication system described above, the BTS 104 initially seeks to establish two-way communication with a corresponding terminal 106. The BTS 104 transmits an indication to "wake up" to the terminal, at which time the terminal initiates a transition from the Idle state to the Active state, and subsequently begins transmitting traffic over the reverse link. In previous systems, under normal operation, the BTS 104 would transmit a forward link signal, typically a one time event, to the terminal 106, which would acquire this forward link signal before beginning transmission on the reverse link. In certain recent systems, including but not limited to cdma2000 Release C, the initial forward link "wake up" transmission by BTS 104 is a signal that includes solely power control feedback data, or a signal having a portion thereof being power control feedback.

Once the terminal 106 receives the "wake up" signal, it begins transmission over the reverse link. The BTS 104 receives the reverse link transmission and executes a power control function that measures the received signal quality, or received signal to noise and interference ratio for the signal received from the terminal 106. The BTS 104 determines whether enough signal to noise ratio (Eb/No) is available, and sends power control feedback commands to the terminal 106, where these commands are used by the terminal 106 to adjust the signal transmit power level for the terminal 106.

The terminal 106 is in a particular state when it receives the command to "wake up" and transition to the Active state from the BTS 104. Previous CDMA systems employed the Idle state and the terminal 106 received a "wake up" command while in the Idle state. Certain CDMA systems allow states other than Idle and Active. In cdma2000, the terminal 106 may be in a "modified idle" state, known as the Control Hold state. "Modified idle" state here refers to the fact that the terminal 106 is available to receive or send signals, but is currently not transmitting or receiving signals continuously with the BTS 104. However, in Control Hold, the terminal is transmitting and receiving certain information across particular channels, such as pilot channels, a modification from Idle states offered in previous systems.

For cdma2000, the power control measurement and feedback mechanism at BTS 104 is activated for all possible feedback channels, time slots, frequencies, or other dimensions transmitted by the BTS. In other words, the BTS 104 has the ability to compute power control signals and provide power control feedback while the terminal 106 is in the Idle state or Control Hold state, and the BTS 104 has the ability to provide data in particular time slots, even though the BTS is not actively transmitting voice or data traffic to or receiving voice or data traffic from the terminal 106. This again differs from previous CDMA systems.

The present design generally includes a modified transition process to more efficiently transition from an initial "wake up" indication to a final operational transmission of power control commands based on measured power signals and effective traffic interaction between the terminal 106 and the BTS 104. While the present description presents particular aspects of the design, it is to be understood that the invention can be applied to any system including transceivers wherein a state transition is requested and power control feedback provided. In such a dual transceiver arrangement, one transceiver initially detects signals indicative of the intent of the other transceiver to transition states. Subsequent to receiving these indicative signals, the first transceiver begins transmitting over the appropriate communication link, i.e the forward or reverse link. The second transceiver receives signals on the communication link and the power controlling transceiver begins transmitting power control commands, specifically commands to increase or decrease power transmission. At a particular point, such as upon receipt of the first power control command or after a period of ignoring power control commands, the power controlled transceiver may begin applying the increase or decrease power commands, as this other transceiver comprehends that the signals transmitted are based on actual power measurements made by the power controlling transceiver.

In one embodiment in accordance with cdma2000, the BTS 104 may request that the terminal 106 transition either from the Idle state to the Active state, or from the Control Hold state to the Active state. When the BTS 104 requests transition and the terminal 106 is in the Idle state, the BTS 104 sends the transition indication to the terminal 106 on the forward common signaling channel, where the transition indication can be in the format of a signaling message, commonly known as a layer-3 message. At the same time or slightly before, the BTS 104 transmits a forward link signal to the terminal 106 over the dedicated forward channel or subchannel, sent to the terminal 106 either in the transition message or in some other manner. This dedicated forward channel or subchannel transmission may include certain power control bits transmitted as power control groups over the subchannel forming part of a common forward link power control channel, the dedicated packet data control channel, or the dedicated or shared packet data channel. The terminal 106 receives the transition indication and starts to detect the transmitted forward link power control bits, among other signals sent by the BTS 104. Before the terminal 106 transmits across the reverse link, the power control bits, commands, or feedback transmitted by the BTS 104 are not based on any signal received from the terminal 106, and may typically be commands for the terminal 106 to increase power. The BTS transmits commands to increase power due to the signal to noise and interference ratio of the reverse link being essentially zero. Prior to, simultaneously with, or after acquisition of the forward link at the terminal 106, the terminal begins transmission on the reverse link that the BTS 104 attempts to detect and acquire. The terminal 106 thereupon transmits voice, data traffic, both, or some other predetermined signal. The BTS 104 awaits voice traffic or some other predetermined signal, and once the traffic or signal is received, the power control mechanism of the BTS 104 computes the proper power control feedback commands and begins transmitting useful feedback commands to the terminal 106. Useful feedback commands refer to feedback commands based on actual signal strength measurements on the reverse link at BTS 104. The terminal 106 uses these useful feedback commands to adjust the terminal transmit power level.

If the terminal 106 is to transition from the Control Hold state to the Active state, the BTS 104 transmits a transition indication to the terminal 106 on the forward common signaling channel or the forward dedicated signaling channel, where the transition indication includes certain power control bits transmitted as power control groups over the subchannel that is part of a common forward link power control channel, the dedicated packet data control channel, or the dedicated or shared packet data channel. The terminal 106 receives this transition indication and detects the transmitted power control bits, while the BTS 104 acquires the reverse link. At this point, the power control bits, commands, or feedback are not based on any signal received from the terminal 106, and again may typically be commands for the terminal 106 to increase power. The terminal 106 acquires the forward link and begins transmitting voice traffic or some other predetermined signal. The BTS 104 waits to receive the voice traffic or other predetermined signal, and once the signal is received, the power control mechanism of the BTS 104 computes the proper power control feedback commands and begins transmitting useful feedback commands to the terminal 106. The terminal 106 uses these useful feedback commands to adjust the terminal transmit power level.

When the terminal 106 is in the Idle state or the Control Hold state and is being signaled by the BTS 104 to transition to the Active state, the terminal 106 is not transmitting on the reverse link to the BTS, and instead monitors all power control feedback from the BTS 104 on the forward power control subchannel assigned to the terminal 106. The terminal 106 detects the presence of the power control groups transmitted on the forward power control subchannel and coherently combines the received feedback signals across a window of power control commands assuming these commands are all of the same content (i.e., increase signal transmission power, etc.). Under typical ambient conditions when in the Idle state or the Control Hold state, the terminal 106 does not transmit any signal to the BTS 104 and the BTS 104 does not transmit power control feedback commands to the terminal. However, in the presence of a command from the BTS to initiate communication, these power control groups are sent to the terminal 106, providing a clear indication of the existence of the dedicated forward link from the BTS 104 to the terminal 106. With no signal having been received from the terminal 106, the BTS 104 will most likely transmit commands to the terminal to increase signal transmission power. The terminal 106 then coherently combines the power control feedback commands and enhances the decision by the terminal 106 regarding the forward link dedicated signal, specifically the decision of how to apply the power control feedback commands.

Coherent combining of the feedback signals enhances the reliability of the detection of the initialization process over the reliability of non-coherent combining, also known as energy detection. Increased reliability results from increasing detection probability (Pd) while maintaining a fixed miss probability (Pm) and a fixed decision delay (DD). Alternately, coherent combining reduces Pm with fixed Pd and DD, or decreases DD with fixed Pd and Pm, or increases Pd, and decreases Pm while decreasing DD, or combination thereof, relative to non-coherent combining of commands.

When the terminal 106 detects the presence of the power control groups transmitted from the BTS 104 using transmitter 208, the terminal 106 activates its transmitter 204 and initiates transmission of either a pre-determined waveform or regular traffic, or the pre-determined waveform followed by regular traffic in response to the initialization attempt received from the BTS 104. "Regular traffic" is used broadly and can comprise call initiation protocols, service information transfers, voice and data transfers, or any other traffic generally used in the context in a wireless communication system. As the BTS 104 power control mechanism has been operating prior to the terminal activating its transmitter, virtually no delay exists between the time the BTS receiver 202 acquires the transmission from the terminal 106, and the time power control is effectively generated at the BTS 104 and executed at the terminal 106. This predetermined waveform, regular traffic, or combination thereof may be measured by the BTS 104 to generate further power control commands using processor 210. Once the terminal receiver 206 detects transmission from the BTS, two-way voice communication can begin.

Figure 3:
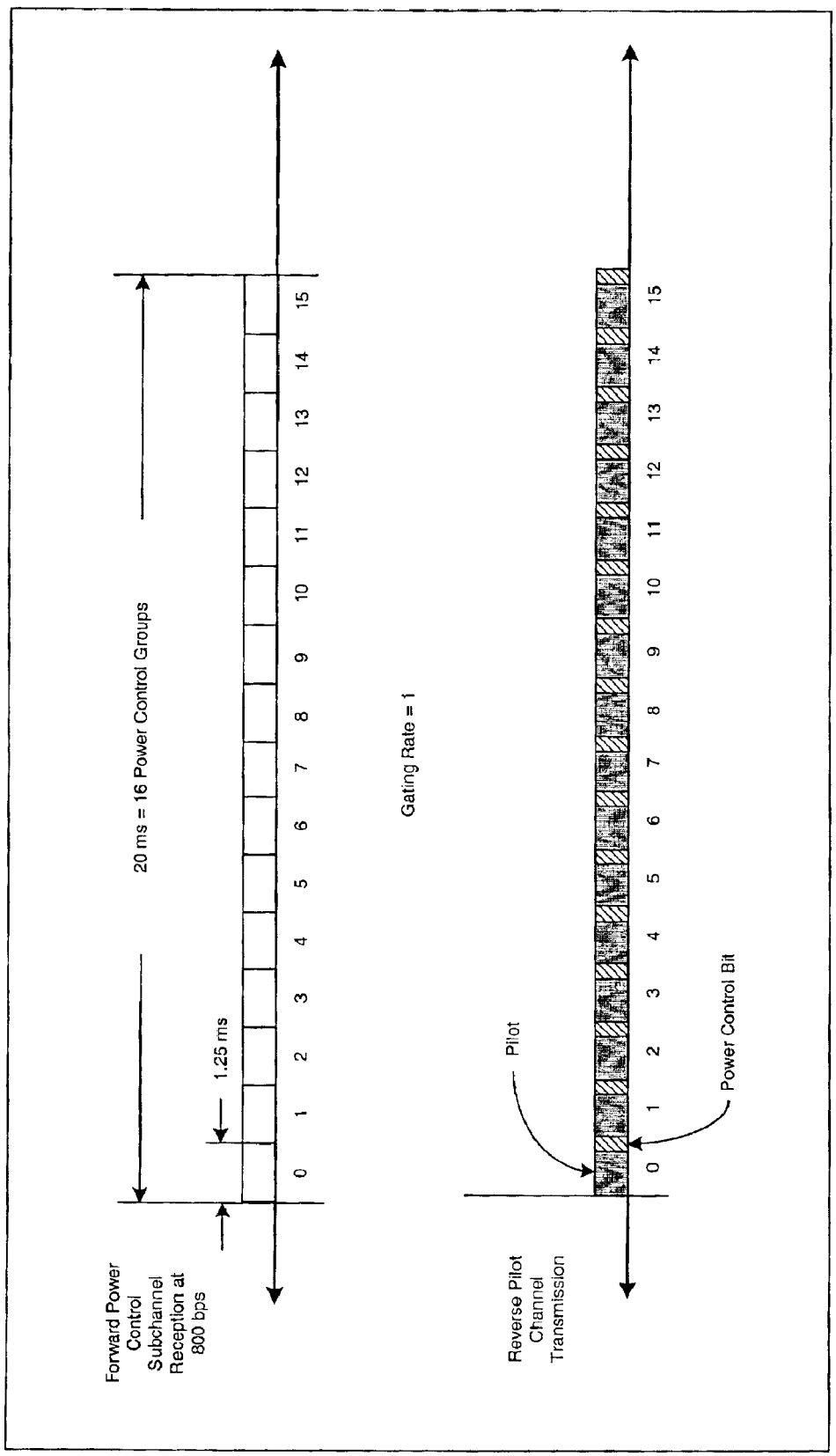
FIG. 3 is a diagram of transmissions on a forward power control subchannel and reverse pilot channel at 800 bps with a gating rate of 1.
Figure 4:
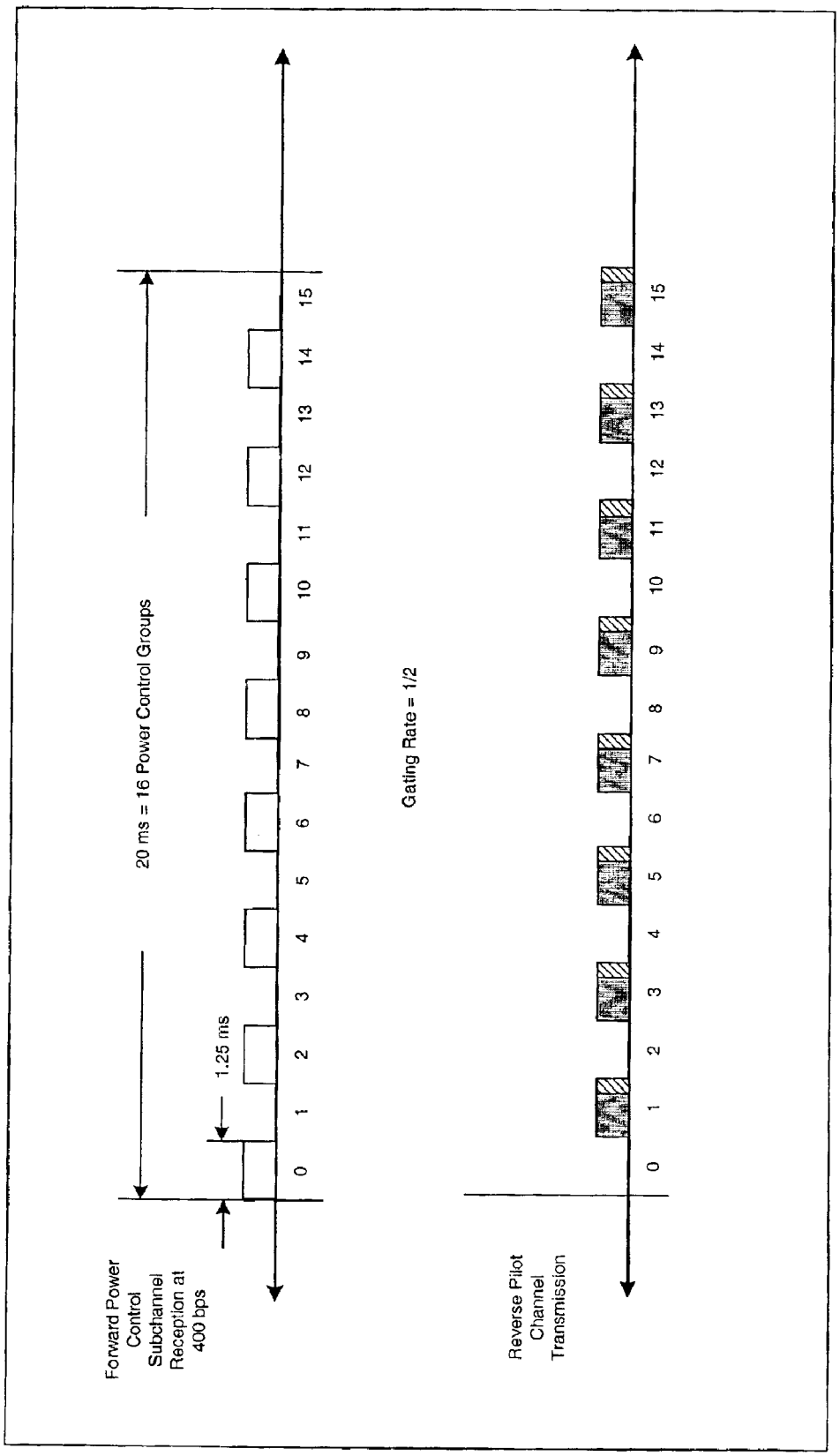
FIG. 4 is a diagram of transmissions on a forward power control subchannel and reverse pilot channel at 400 bps with a gating rate of ½.
Figure 5:
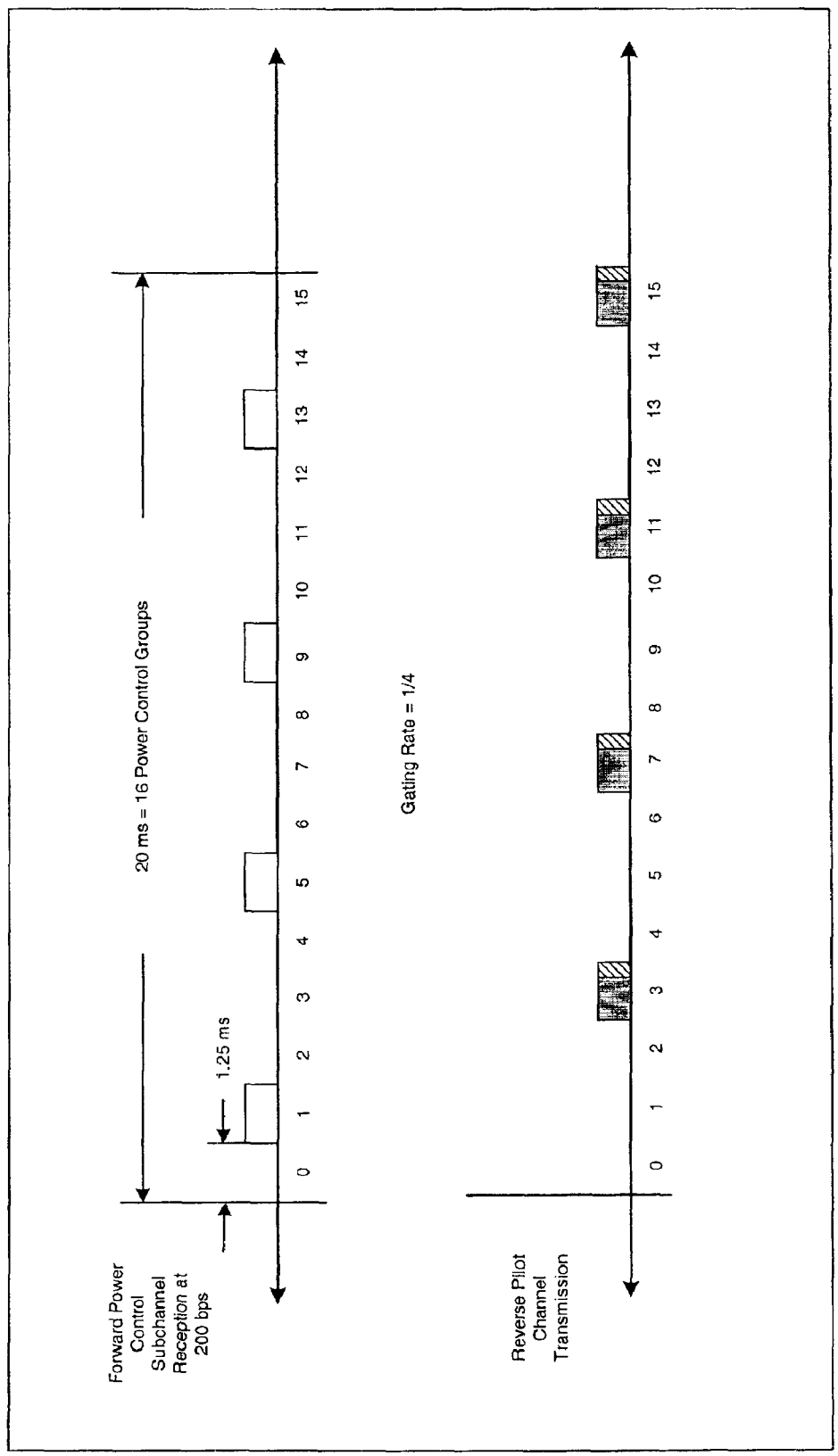
FIG. 5 is a diagram of transmissions on a forward power control subchannel and reverse pilot channel at 200 bps with a gating rate of ¼.

For cdma2000, the forward link power control subchannel carries the power control group from the BTS 104 to the terminal 106. Certain gating patterns of cdma2000 control hold state are illustrated in FIGS. 3–5. Other gating patterns exist and different gating patterns can be employed while still within the scope of the present invention. FIG. 3 illustrates forward and reverse power control subchannel transmission timing at a gating rate of 1 and transmission at 800 bps. On the forward link, the content of the power control transmission is predetermined and specified to have a particular format and content, namely a fixed pattern not based on measurement of the reverse link, such as multiple periodic transmissions of a fixed value. The terminal has the ability to communicate with the BTS on the reverse link using the reverse pilot channel or the reverse dedicated control channel, and the terminal transmits the pilot signal 301 and the power control bit 302 over the reverse link in the arrangement shown. When the terminal 106 transitions from the Idle state to the Active state, all power control commands on the forward link dedicated to the terminal 106 provide signal energy for detection by the terminal 106. When the terminal 106 is in the Control Hold state, no time is available in this transmission scheme to provide additional signals on either the forward link or the reverse link. In FIG. 4, the gating rate is ½ with reception at 400 bps. This timing provides spacing on the reverse channel for inclusion of additional data, such as additional power control data, on both the forward and reverse links. FIG. 5 shows a gating rate of ¼, with forward power control subchannel reception at 200 bps, having additional time for power control commands on the power control subchannel in addition to the power control groups normally transmitted. In certain CDMA environments, it has been beneficial to use ¼ gating to reduce interference between terminals on the reverse link, and thus ¼ gating is commonly employed.

For all forward link and reverse link transmissions, it should be noted that the transmission of the pilot signal and power control bit are offset in time from the associated power control group transmission on the forward link. Thus the forward link carries the power control group at one interval, and the reverse pilot channel carries the pilot signal and power control bit at a later time.

The initial forward link transmission by the BTS 104 when initializing a terminal 106 can be the same as in the forward link portion of FIG. 3. In this Idle to Active transition, in one aspect, the reverse link is not being transmitted before the acquisition of the forward link dedicated signals (power control subchannel) by the terminal 106. In another aspect, the terminal 106 starts the transmission of the reverse link before the acquisition of the dedicated forward link channel or subchannel by the terminal 106. The reverse link would be the same as shown in FIG. 3.

Figure 6:
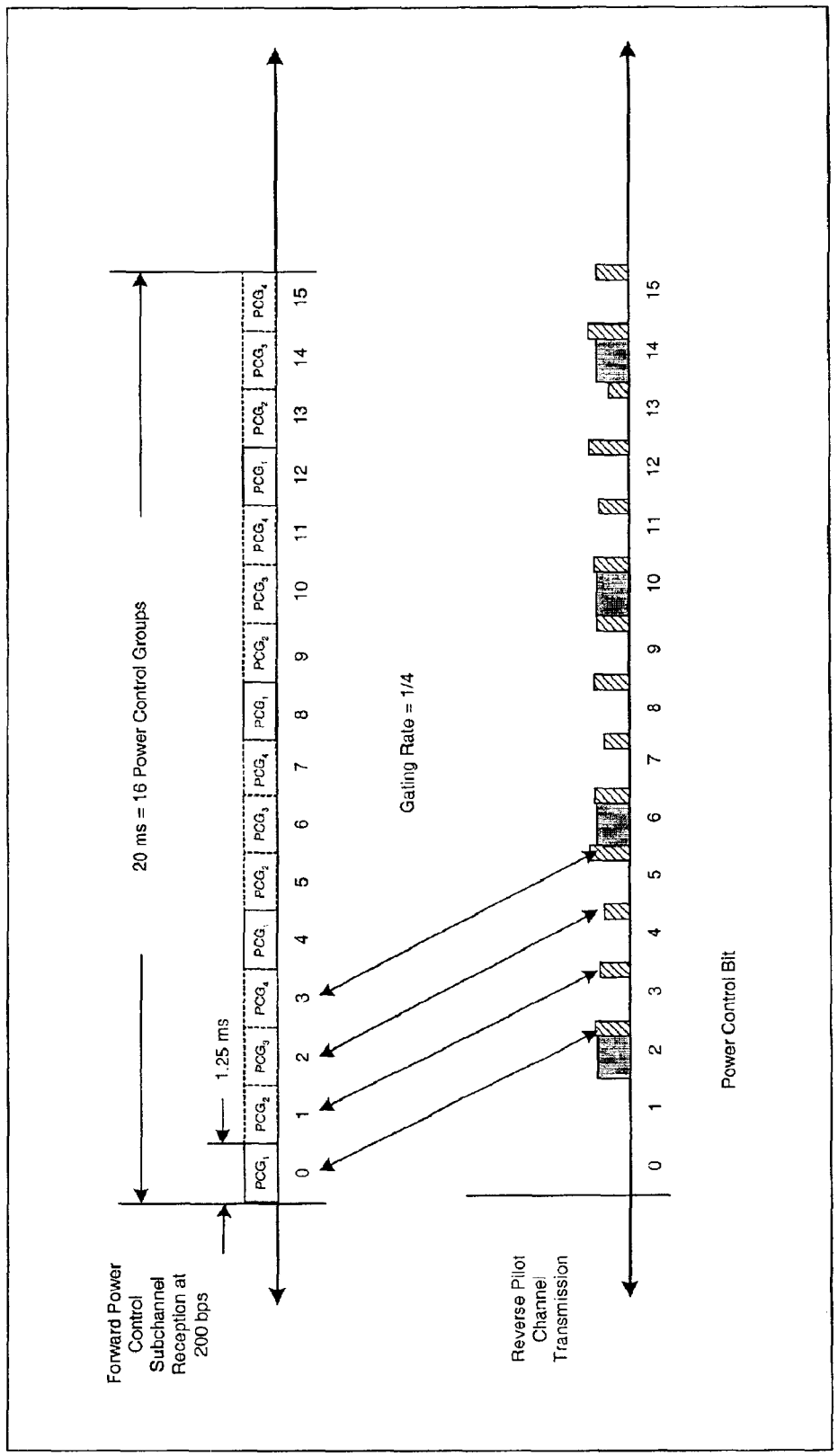
FIG. 6 is a diagram of transmissions according to a first aspect of the present design with an exemplary gating rate of ¼.

In this aspect of the design, the forward link of the power control subchannel operates as shown in FIG. 6, transmitting power control groups at a predetermined gating rate and time interval. For the implementation shown, the power control function of the BTS 104 is initiated and begins measuring the reverse link pilot channel for a period of time. When the terminal 106 is in either ithe Idle or Control Hold state, the BTS 104 receives no transmission on the reverse link pilot channel. The BTS 104 subsequently transmits energy on the forward link in the power control groups that have not traditionally been used for transmission as an indication to the terminal 106 to initiate the Active state and begin transmission. The terminal 106 receives these commands knowing it, the terminal, is not transmitting, collects the transmissions and coherently combines them to form a combined command, such as by summing the squares of the energy received in different power control commands on the forward link. Noise and environmental effects can affect the quality of the information received at the terminal 106.

For example, the BTS 104 may send power control groups PCG1 through PCG4 shown in FIG. 6, each having magnitude +1.0 where +1.0 is an "up" command and −1.0 is a "down" command. Due to channel disturbance, the terminal 106 may receive actual readings of 0.5, 1.5, 0.0, and 1.2. The terminal may sum the squares of each individual reading, resulting in $(0.5)^2+(1.5)^2+(0)^2+(1.2)^2=3.94$, and then decide whether this is sufficiently close to the ideal $1^2+1^2+1^2+1^2=4$, to decide whether the signal is present. The terminal may alternately square the sum of the readings, resulting in $(0.5+1.5+0.0+1.2)^2$, or 10.24, which is closer to the ideal (16) than to no signal (0). This larger range, 0 to 16 in the present example, tends to provide an improved reliability over the range of 0 to 4. Further, use of multiple power control groups enhances the reliability of the reading computed by the terminal 106. Both summation and squaring techniques may be employed, with summing the collected readings and squaring the result generally providing a larger range and better reliability. This scheme includes transmission and receipt of power control groups PCG1 through PCG4, which would previously have not been transmitted but are transmitted in this aspect of the invention to enhance the quality of the signal received.

Terminal 106 has knowledge of the point in time when it begins transmitting on the reverse link. Knowing the time when it initiates transmission on the reverse link, plus knowing the delay between the reverse link transmission and the corresponding forward link power control command, the terminal 106 can calculate the time when the "all up" assumption for detection purposes has completed. After the power control commands corresponding to the transmitted reverse link PCGs arrive, the commands cannot be assumed to be all "up" commands. Thus the terminal can end its "all up" assumption period and receive and apply accurate power control commands relatively rapidly.

The coherent combining of previously non-transmitted (in Idle state) or redundant (in Control Hold state) power control groups in the detection process at the terminal 106 enables the terminal to increase the probability of initiation detection, and/or decrease miss probability, and/or decrease decision delay over the transmission of a single power control group. The terminal may receive an initial indication to increase power, as in the foregoing scheme the BTS 104 still transmits an open loop power control command, which is likely a command to increase power. The terminal 106 may address this initial command or commands by ignoring data for a fixed period of time or, alternately, the BTS may transmit commands other than increase power, such as hold current power or increase power to a level less than a full interval. Thus the period where the BTS 104 waits for the terminal 106 to "wake up" is reduced, and the period the terminal takes to "wake up" and receive and initiate voice traffic is not required for the BTS to begin measuring terminal transmit power levels.

From the terminal 106 perspective, the terminal 106 has a priori knowledge of the timing or delay of the power control groups, and thus has the ability to determine the validity of the power control groups and recognize the attempt by the BTS 104 to initiate communication. The terminal 106 then begins transmitting over the reverse link, and power control commands may be transmitted by the BTS 104. The terminal 106 may ignore the power control commands received for a period of time, as the commands cannot be based on actual signal to noise ratios transmitted from the terminal 106 to the BTS 104. The period that the terminal 106 ignores power control commands could be on the order of the transmission delay plus an expected processing delay at the BTS 104. During this period while the terminal is ignoring BTS transmissions, the BTS 104 is acquiring the reverse link, makes computations based on signal strength received, and begins transmitting valid commands based on real measurements. During the period when the terminal is ignoring power control commands, the terminal 106 does not perform the detection and coherent combining of signals described previously.

The foregoing description primarily addresses initialization of the terminal transmission on the reverse link once it has detected the forward link. The terminal 106 may alternately seek to initiate communication with the BTS 104. In such a situation, the BTS 104 detects reverse link power control commands through coherent combining as discussed above. In operation, the terminal 106 transmits a predetermined series of power control commands on the reverse link when it wishes to establish communication with the BTS 104. The BTS receives the series of power control commands and coherently combines them to determine whether the terminal seeks to initiate communication. Once the BTS 104 determines via coherent combining that the terminal 106 seeks to initiate communication, it seeks to establish communication on the forward link, initiates the power control function, and begins transmitting power control commands over the forward link. Once communication on the forward link is established, the BTS 104 and the terminal 106 begin two-way communication. The terminal 106 may optionally ignore received power control commands for a period of time.

Operation of the present design in systems other than cdma2000 may be in a similar manner to that described above. The BTS 104 may request that the terminal 106 transition from the Idle state to the Active state by sending a transtion indication to the terminal 106 on the forward link, where the transition indication can be in the form of a message on a common channel followed by certain power control bits transmitted as power control groups. The terminal 104 may receive from the BTS 106 the identity of the forward link dedicated channel over which the terminal 104 will receive traffic when the terminal 106 transitions from Idle to Active. The BTS 106 may then activate the forward link dedicated channel by initiating transmission of power control bits and possibly other waveforms, including but not limited to transmission of null frames. The terminal 106 subsequently may detect the power control bits to confirm the existence of the dedicated channel. Before the terminal 106 transmits across the reverse link, the power control bits, commands, or feedback transmitted by the BTS 104 are not based on any signal received from the terminal 106, and may typically be commands for the terminal 106 to increase power. The BTS 104 transmits commands to increase power due to the signal to noise and interference ratio of the reverse link being essentially zero. Prior to, simultaneously with, or after acquisition of the forward link at the terminal 106, the terminal begins transmission on the reverse link that the BTS 104 attempts to detect and acquire. The terminal 106 thereupon transmits voice, data traffic, both, or some other predetermined signal. The BTS 104 awaits voice traffic or some other predetermined signal, and once the traffic or signal is received, the power control mechanism of the BTS 104 computes the proper power control feedback commands and begins transmitting useful feedback commands to the terminal 106. Useful feedback commands refer to feedback commands based on actual signal strength measurements on the reverse link at BTS 104. The terminal 106 usps these useful feedback commands to adjust the terminal transmit power level.

In another aspect of the present invention in cdma2000, while in the Idle or Control Hold state, the terminal transmitter 204 is active on some, but not all, of its transmitter dimensions, such as channels, time slots, frequencies, and so forth. Both the terminal transmitter 204 and the feedback channel of the BTS are idle on some feedback dimensions, such as channels, time slots, frequencies, and so forth. In this aspect, power control measurement and feedback at the BTS 104 may be activated for those feedback dimensions. Since the terminal transmitter 204 is not transmitting, it monitors the power control feedback provided from the BTS on dimensions that are normally idle and coherently combines the feedback across a window of commands, assuming these commands are all of the same content, such as increase signal transmission power, and so forth.

Again, the BTS 104 initiates its power control processing with the intent of transitioning the terminal from either Idle or Control Hold to Active. The BTS transmits power control commands across unused channels, time slots, or frequencies. When the terminal 106 detects the presence of the power control feedback from the BTS 104 on these unused channels, time slots, or frequencies, it activates the terminal transmitter 204 on either all or part of the previously idle dimensions and starts the transmission of either a predetermined waveform or regular traffic, or the pre-determined waveform followed by regular traffic as a response to the initialization attempt from the BTS 104. As the BTS power control mechanism has been in operation, minimal delay exists between the time the terminal receiver acquires the transmission from the BTS 104 and the time power control is effectively generated at the BTS and executed at the terminal 106. Once the terminal detects the transmission from the BTS 104, two-way communication can begin.

The difference between this second aspect and the previous description is that the second aspect does not include transmission of multiple power control groups, but instead utilizes unused channels, time slots, or frequencies to "wake up" the terminal 106 and initiate power control feedback between the BTS 104 and the terminal 106. While this second aspect can include transmission of multiple power control groups or indications to begin transmission over the forward link on unused channels, time slots, or frequencies, a single power control group may be employed to indicate to the terminal 106 that the BTS 104 intends to initiate communication and transition from the control hold state to the active state. Examples of unused channels, time slots, or frequencies include but are not limited to transmitting an indication over the packet data control channel, or puncturing commands sent over the forward fundamental channel or the forward dedicated control channel.

In both aspects described, the terminal 106 receives useful power control feedback from the BTS 104 more rapidly than previously available. In the foregoing aspects of the present system, the terminal 106 has exact knowledge of the time it begins transmitting, and as a result, a clear distinction exists between power control commands sent by the BTS 104 as an initialization signal. This clear differentiation affords the terminal the opportunity to begin monitoring BTS power commands earlier and transmit signals earlier than previous systems. Previous systems required the terminal to wait for power control commands sent by the BTS 104 in response to a voice traffic transmission from the terminal 106 while the terminal was in the active state. With the present faster acquisition and valid power command transmission design of the foregoing aspects of the present system, detection, acquisition, and transmission of signals sent from the terminal 106 to the BTS 104 take a minimal but non-zero amount of time to be received. The terminal 106 thus has the ability to adjust its transmitter power based on all of the received commands, or only those commands received after a certain detection/acquisition/transmission delay tailored for the known operation of the BTS 104. A CDMA system other than cdma2000 may operate in the same manner when transitioning from Idle to Active.

Figure 7:
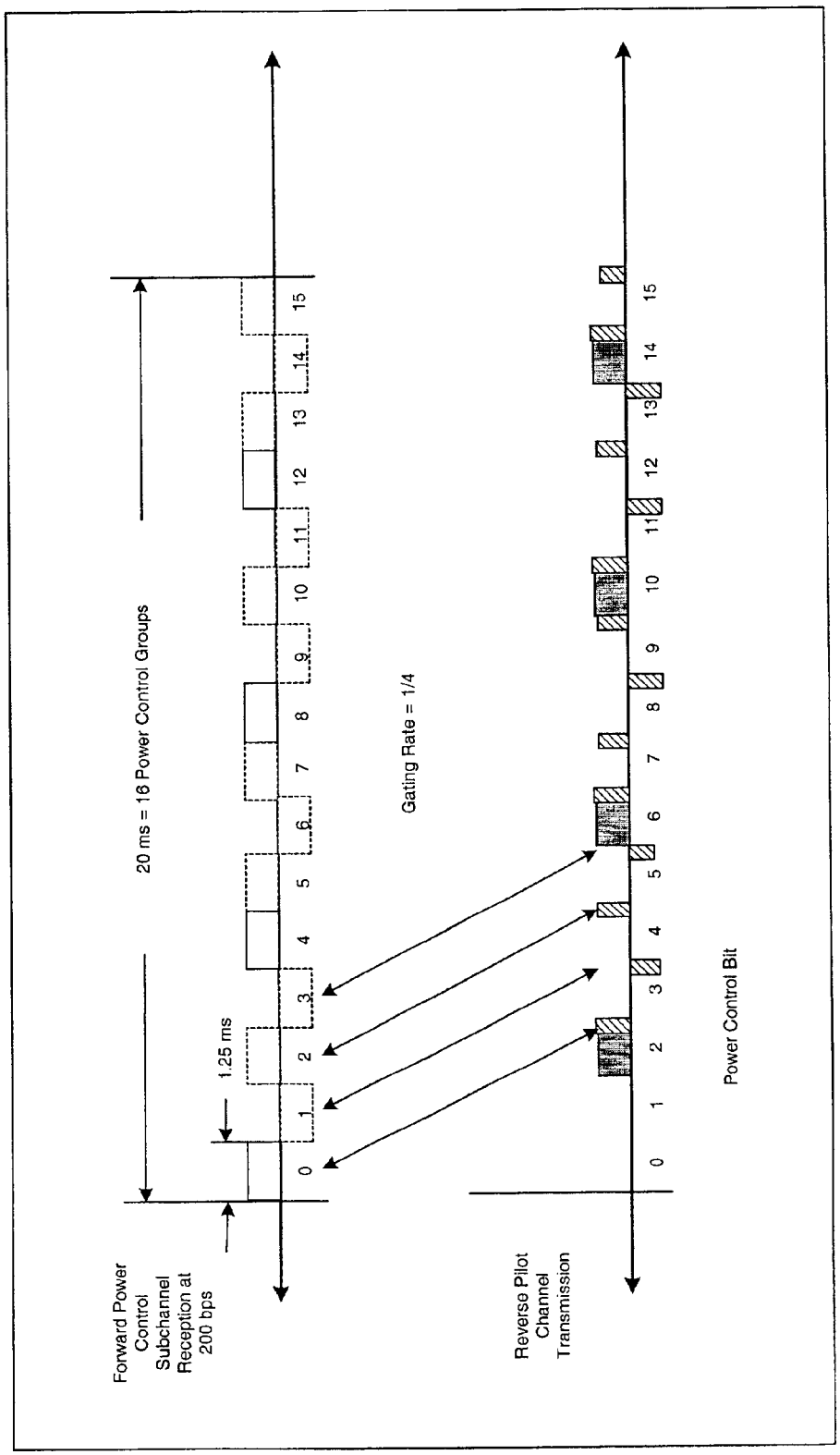
FIG. 7 is a diagram of transmissions according to a third aspect of the present design with an exemplary gating rate of ¼.

In a third aspect of the design, the BTS 104 sends a pre-determined pattern of power control commands to the terminal as an initialization signal, such as a series of power control groups of different polarity. This pattern is designed to hold the power of the terminal transmitter 204 in place, such as by sending one "increase signal transmission power" command followed by one "reduce signal transmission power" command. These power control commands can be sent with predetermined timing. Once the frame boundary or system is known, the pattern sent becomes deterministic. For example, in the transmission arrangement of FIG. 7, the gating rate is ¼ and one power control group is followed by three blank 1.25 ms frames. In this aspect of the design, the BTS 104 may transmit a plus-minus-plus grouping of signals after a power control group, followed by another power control group, and then a minus-plus-minus signal grouping. Terminal 106 coherently combines these commands to increase the detection reliability of this initialization signal. The terminal 106 is preprogrammed with the command pattern available from the associated BTS 104, including the command pattern used to start transmission at the terminal 106 in response to this signal from BTS 104, and about the possible delay the BTS power control function would take to detect, acquire, and transmit feedback commands back to the terminal 106. This delay may be used to restrict terminal usage of the feedback control signals not based for the period of time the feedback control signals are not based on actual terminal energy transmissions. The beginning of actual power control measurement and subsequent feedback from the BTS 104 terminates the fixed power control command pattern from the BTS 104. The BTS then transmits actual useful power control commands to the terminal 106. Again, such a scheme may be employed in CDMA systems other than cdma2000.

Figure 8:
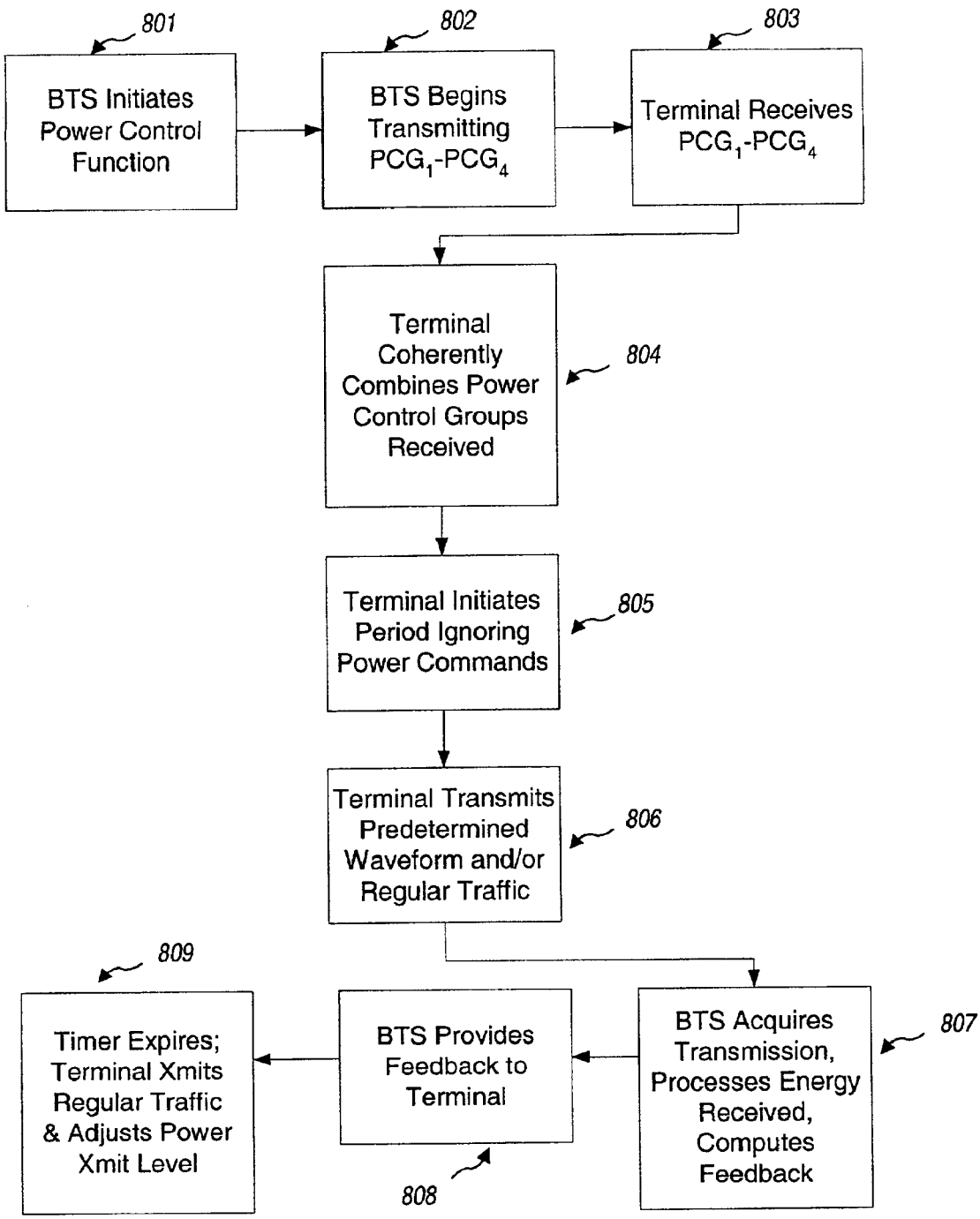
FIG. 8 is a block diagram of operation of a first aspect of the present design.

FIG. 8 is a block diagram of the first aspect of the design. From FIG. 8, the BTS initiates the power control function at point 801. The BTS begins transmitting groups of redundant power control groups, such as $PCG_1$ through $PCG_4$, at point 802. The terminal 106 receives power control groups $PCG_1$ through $PCG_4$ at point 803. At point 804, the terminal 106 coherently combines the power control groups received on the forward link and determines, in the presence of ¼ gating with the BTS, that the presence of four power control groups means the BTS wishes the terminal to transition from Idle or Control Hold to Active. With the ¼ gating scheme of the present example, the terminal receiving four contiguous power control groups while in Idle or Control Hold will combine the four groups coherently to determine the presence of the transition indication from the BTS 104. At point 805, the terminal begins the Power Command Ignore interval. At point 806, the terminal begins transmitting a predetermined waveform, regular traffic, or a predetermined waveform followed by regular traffic to establish a signal on the reverse link measurable by the BTS 104. At point 807, the BTS acquires the terminal transmission, processes the energy received, and transmits meaningful feedback. At point 808, the BTS transmits the feedback to the terminal. At point 809, the Power Command Ignore interval expires, indicating to the terminal the presence of valid commands from the BTS. The terminal 106 thus begins transmitting regular traffic to the extent it has not already done so, and adjusts the power control according to the power control feedback received.

Figure 9:
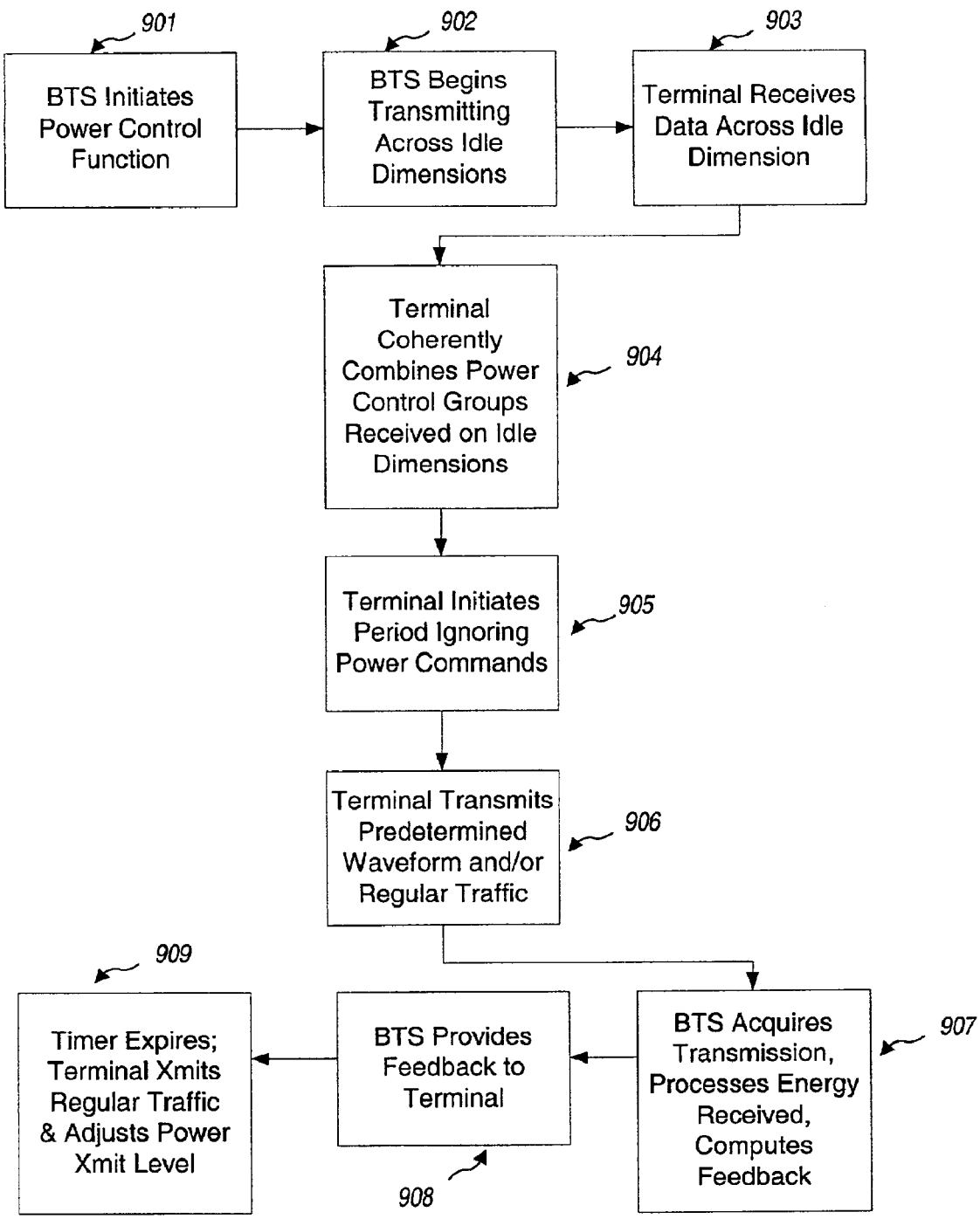
FIG. 9 is a block diagram of operation of a second aspect of the present design.

FIG. 9 is a flowchart for the second aspect of the present design. From FIG. 9, the BTS initiates the power control function at point 901. The BTS begins transmitting data across idle feedback dimensions at point 902. The terminal 106 receives the data transmitted across idle feedback dimensions at point 903. At point 904, the terminal 106 coherently combines the power control groups received on the idle feedback dimensions and determines that the presence of data on these idle dimensions means the BTS wishes the terminal to transition from Idle or Control Hold to Active. The coherent combining at point 904, typically presumes the presence of identical signals, such as commands to increase power, and determines the presence of the signal based on the coherently combined aspects of the received data. At point 905, the terminal begins the Power Command Ignore interval. At point 906, the terminal begins transmitting a predetermined waveform, regular traffic, or a predetermined waveform followed by regular traffic to establish a signal on the reverse link measurable by the BTS 104. At point 907, the BTS acquires the terminal transmission, processes the energy received, and transmits meaningful feedback. At point 908, the BTS transmits the feedback to the terminal. At point 909, the Power Command Ignore interval expires, indicating to the terminal the presence of valid commands from the BTS 104. The terminal thus begins transmitting regular traffic to the extent it has not already done so, and adjusts the power control according to the power control feedback received.

Figure 10:
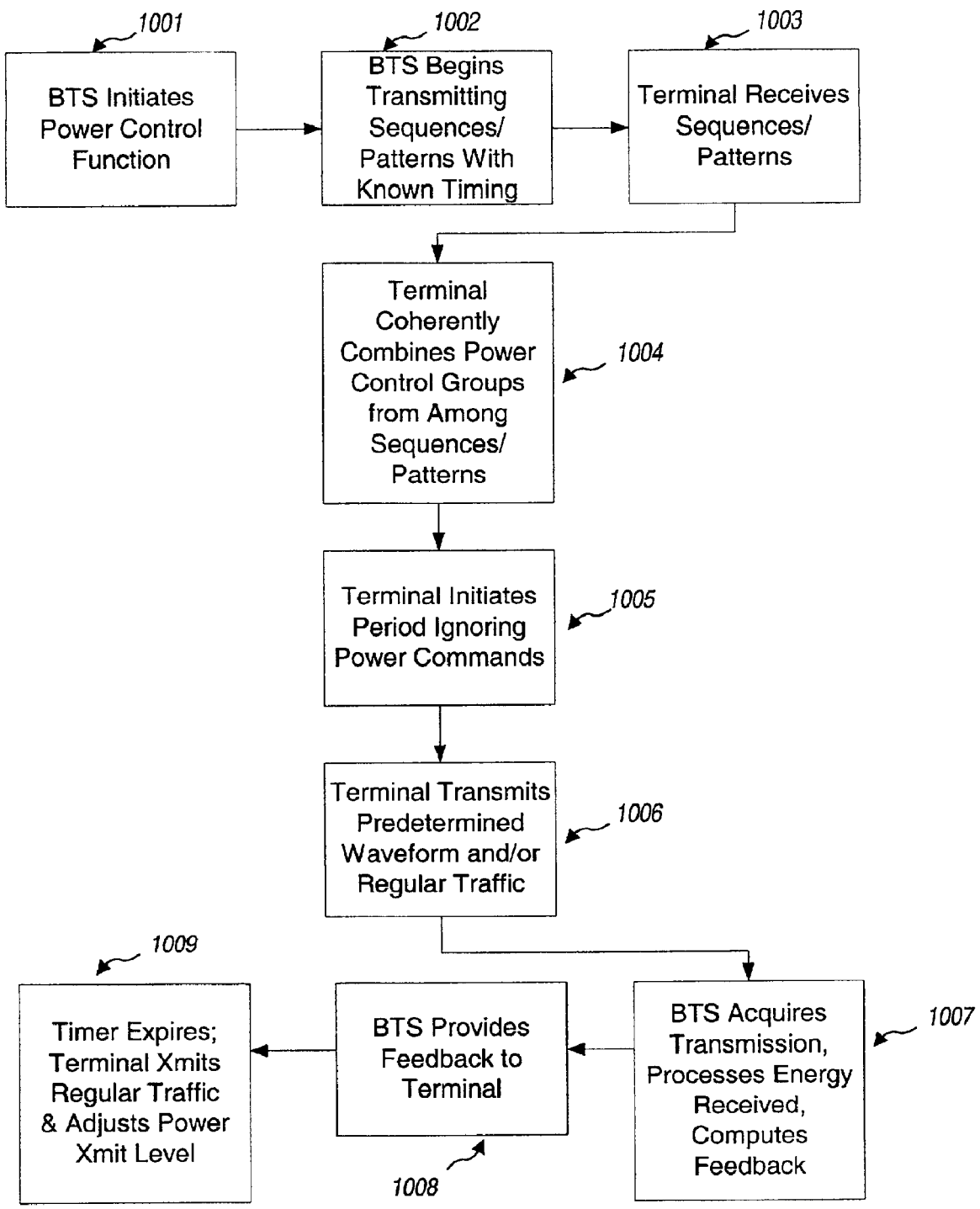
FIG. 10 is a block diagram of operation of a third aspect of the present design.

FIG. 10 is a flowchart for the third aspect of the present design. From FIG. 10, the BTS initiates the power control function at point 1001. The BTS begins transmitting sequences or patterns of signals with known timing, such as a power control group followed by a plus one-minus one-plus one group in a ¼ gating scheme, at point 1002. The terminal 106 receives the power control group followed by the plus-minus-plus group at point 1003. At point 1004, the terminal 106 coherently combines the power control group and signals and compares the subsequent signals to and possibly the power control group against a known pattern to determine the likelihood the grouping or pattern match the predetermined signal pattern received on the forward link and determines, in the presence of ¼ gating with the BTS, that the presence of a power control group and a plus one-minus one-plus one pattern means the BTS wishes the terminal to transition from Idle or Control Hold to Active. The terminal begins ignoring power commands at point 1005. At point 1006, the terminal begins transmitting a predetermined waveform, regular traffic, or a predetermined waveform followed by regular traffic to establish a signal on the reverse link measurable by the BTS 106. At point 1007, the BTS acquires the terminal transmission, processes the energy received, and transmits meaningful feedback. At point 1008, the BTS transmits the feedback to the terminal. At point 1009, the Power Command Ignore interval expires, indicating to the terminal the presence of valid commands from the BTS. The terminal thus begins transmitting regular traffic to the extent it has not already done so, and adjusts the power control according to the power control feedback received.

The power control mechanism of the invention, and specifically the power control adjustment aspect of the system, can be implemented within one or more base stations in communication with the remote terminal, some other elements of system 100, or a combination thereof. Those of skill in the art would understand that information, states, substates, channels, and signals may be represented using any of a variety of different technologies and techniques. For example, data, instructions, commands, information, signals, bits, symbols, and chips referenced in the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. In particular for the present application, while certain blocks and functionality are said to exist at the BTS, it is to be specifically understood that these components and/or this functionality may be located, performed, or otherwise operate in an alternate manner within the hardware and software, other hardware and software, or at different locations within the system illustrated in FIG. 1.

The previous description is provided to enable any person skilled in the art to make or use the present invention. Various modifications to these aspects will be readily apparent to those skilled in the art, and the generic principles defined herein may be applied to other embodiments without departing from the spirit or scope of the invention. Thus, the present invention is not intended to be limited to the aspects presented herein but is to be accorded the widest scope consistent with the principles and novel features disclosed herein.

What is claimed is:

1. A method for controlling signal strength transmitted in a wireless communication system, comprising:
   detecting at a second transceiver presence of a plurality of predetermined power control groups received from a first transceiver, wherein said first receiver ignores any power transmission level adjustment factor received;
   coherently combining the plurality of predetermined power control groups;
   determining whether the coherently combined power control groups constitute an indication to transition states;
   activating a transmitter at said second transceiver; and
   transmitting either:
     pre-determined waveforms, or
     regular traffic information, or
     said pre-determined waveforms followed by said regular traffic information.

2. The method of claim 1, further comprising:
   receiving the pre-determined waveforms or regular traffic information or said pre-determined waveforms followed by said regular traffic information at said second transceiver; and
   computing a power transmission level adjustment factor for the first receiver.

3. The method of claim 2, further comprising:
   transmitting said power transmission level adjustment factor to the first receiver; and
   adjusting a power level transmission at the first transceiver based on the power transmission level adjustment factor.

4. The method of claim 1, wherein said window of commands comprises feedback provided across an unused feedback dimension.

5. The method of claim 4, wherein said unused feedback dimension comprises one from a group comprising:
   a transmission channel;
   a time slot; and
   a predetermined frequency.

6. The method of claim 1, wherein the window of commands comprises a predetermined transmission sequence.

7. The method of claim 6, wherein the predetermined transmission sequence comprises elements unrelated to power control.

8. The method of claim 2, further comprising:

initiating a sequence subsequent to said detecting.

9. A method of transitioning states in a wireless communication system, comprising:

receiving a plurality of predetermined power control groups at a first transceiver, wherein said first transceiver ignores any power transmission level adjustment factor received;

coherently combining said predetermined power control groups at said first transceiver;

determining whether the coherently combined power control groups constitute an indication to transition states; and transmitting, subsequent to said coherent combining, a transmission set from said first transceiver to a second transceiver, said transmission set comprising at least one from a group comprising:
predetermined waveforms; and
regular traffic.

10. The method of claim 9, further comprising:

receiving the transmission set at the second transceiver; and computing a power transmission level adjustment factor for the first transceiver.

11. The method of claim 10, further comprising:

transmitting said power transmission level adjustment factor to the first transceiver; and adjusting a power level transmission at the first transceiver based on the power transmission level adjustment factor.

12. The method of claim 9, wherein said power control information comprises feedback provided across an unused feedback dimension.

13. The method of claim 12, wherein said unused feedback dimension comprises one from a group comprising:

an unused transmission channel;

an unused time slot; and an unused predetermined frequency.

14. The method of claim 9, wherein the power control information comprises a predetermined transmission sequence.

15. The method of claim 14, wherein the predetermined transmission sequence comprises elements unrelated to power control.

16. The method of claim 10, further comprising:

initiating a sequence subsequent to said detecting.

\* \* \* \* \*